Dec. 31, 1968   J. W. BEGLEY ET AL   3,419,597
PRODUCTION OF ACRYLONITRILE
Filed Jan. 22, 1968                              Sheet 2 of 2

INVENTORS
J. W. BEGLEY
L. W. POLLOCK
BY
*Young & Quigg*
ATTORNEYS

United States Patent Office 3,419,597
Patented Dec. 31, 1968

3,419,597
PRODUCTION OF ACRYLONITRILE
John W. Begley, Bloomfield, N.J., and Lyle W. Pollock, Bartlesville, Okla., assignors to Phillips Petroleum Company, a corporation of Delaware
Continuation-in-part of application Ser. No. 422,376, Dec. 30, 1964. This application Jan. 22, 1968, Ser. No. 699,456
12 Claims. (Cl. 260—465.3)

ABSTRACT OF THE DISCLOSURE

In a process for producing acrylonitrile by passing to a catalytic convertor hydrocyanic acid and acetylene formed by the action of a plasma stream on ammonia and a lower alkane hydrocarbon such as methane or ethane, the yield of acrylonitrile product is increased relative to the yield of nitrogen containing by-product such as succinonitrile, acetonitrile, and propionitrile, by passing at least a portion of the by-products from the catalytic converter to the plasma stream as quench. The yield of acrylonitrile is further increased by simultaneously passing portions of the by-products to the plasma stream and the catalytic convertor respectively.

---

This is a continuation-in-part of application Serial No. 422,376, filed Dec. 30, 1964 now abandoned.

This invention relates to the production of acrylonitrile. In another aspect, this invention relates to a process for the production of acrylonitrile from an acetylene-hydrocyanic acid feed stream produced by the action of a plasma flame.

A known method for producing acrylonitrile comprises contacting methane with a plasma stream under conditions to form an effluent stream containing acetylene, quenching the plasma stream with ammonia in an amount sufficient to cool the stream and form a reaction mixture of acetylene and hydrocyanic acid and contacting said reaction mixture with a catalyst to produce acrylonitrile. In this process, by-product nitrogen containing compounds are unavoidably formed. We have now discovered that the production of the by-products can be minimized or compensated for by recycling the by-product nitrogen containing compound.

It is, therefore, an object of this invention to provide a process for the production of acrylonitrile.

It is an object of this invention to provide an apparatus for the production of acrylonitrile wherein the production of nitrogen containing by-products unavoidably produced therein is minimized.

It is a further object of this invention to provide a process for minimizing the production of nitrogen containing by-products in a process for producing acrylonitrile.

It is a further object of this invention to provide a process for separating the products from an acrylonitrile reactor.

Other aspects, objects and the several advantages of this invention are apparent to one skilled in the art from a study of this disclosure, the drawings and the appended claims.

According to the invention, acetylene and hydrocyanic acid are produced in a plasma flame reactor and passed to an acrylonitrile convertor wherein product acrylonitrile and by-products such as succinonitrile, acetonitrile, and propionitrile are produced. The product acrylonitrile is separated from the by-products and at least one of the by-products is recycled as quench to the plasma flame. In another embodiment, the effluent from the acrylonitrile convertor is scrubbed, stripped, and the product is separated from the by-products which are subsequently recycled to the plasma flame as quench. In still another embodiment, the acrylonitrile convertor is a fluidized-bed catalytic bed reactor, the products are separated from the by-products, the products are scrubbed, and the by-products are recycled to the process.

Figure 2:
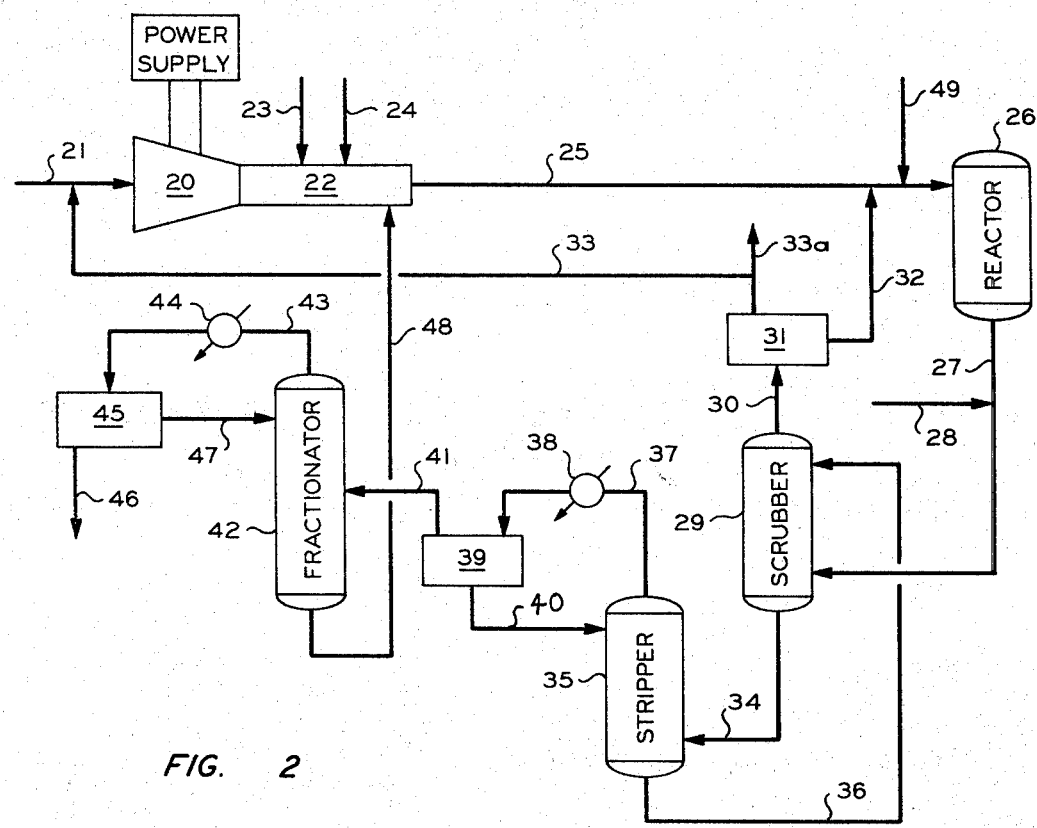
Figure 1:
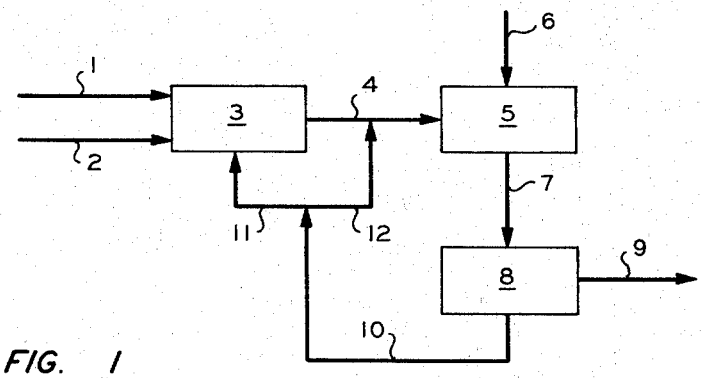
Figure 4:
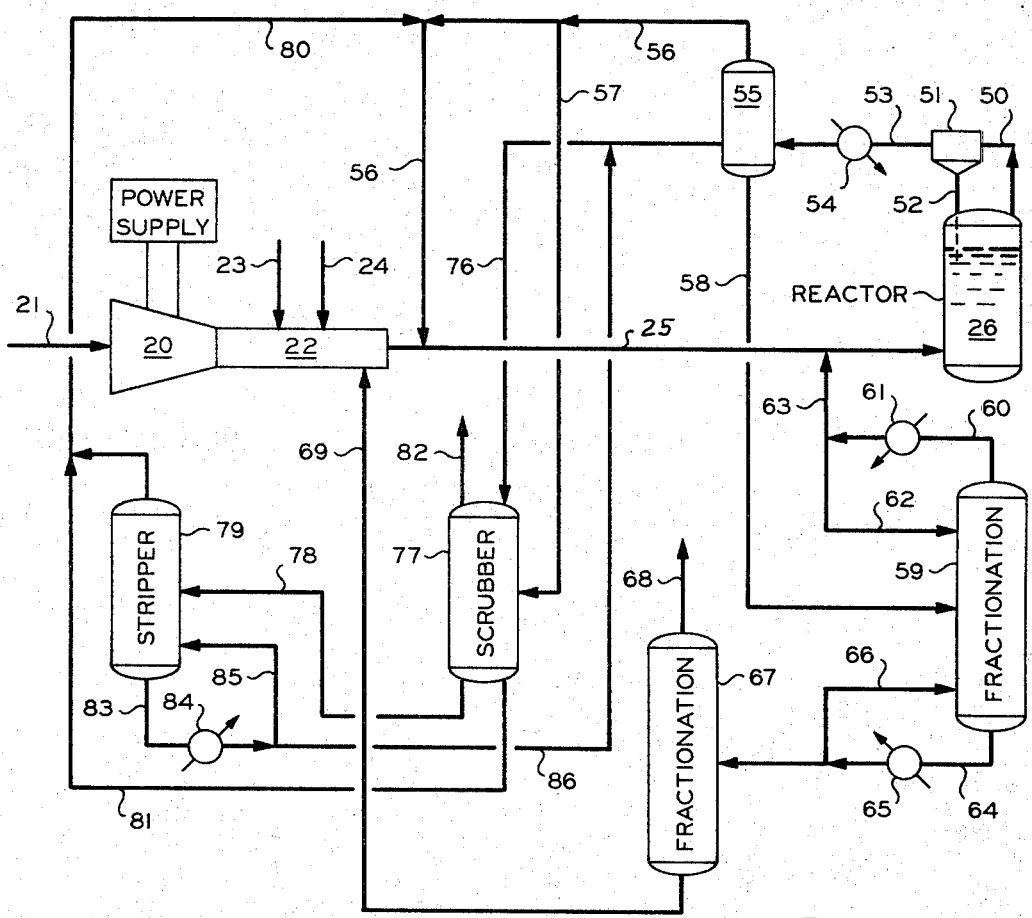
Figure 3:
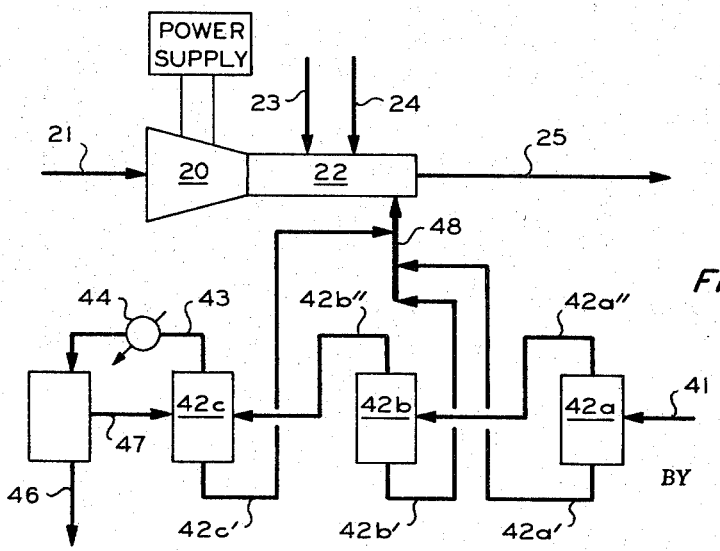

The invention can be better understood by reference to the accompanying drawings of which FIGURE 1 is a diagrammatic sketch showing a broad concept of the invention; FIGURE 2 is a more detailed diagrammatic view showing an embodiment of this invention; FIGURE 3 is a diagrammatic view showing a detail of FIGURE 1; and FIGURE 4 is a diagrammatic view showing an embodiment of this invention which utilizes a fluidized-bed reactor.

Referring now to FIGURE 1 which illustrates a broad concept of this invention, a plasma stream reactor 3 having a feed of ammonia entering through line 1 and hydrocarbon entering through line 2 produces acetylene and hydrocyanic acid, which are removed through line 4 and passed to reactor 5. Suitable hydrocarbon feeds for plasma flame reactor 3 include the lower alkanes, preferably the lower alkanes which are vaporous at room conditions such as methane, ethane, propane, butane and pentane.

Reactor 5 contains a catalyst suitable for converting the acetylene and hydrocyanic acid to acrylonitrile. Preferred catalysts are alkali metal cyanides on suitable inert catalytic supports such as charcoal, silica, natural and synthetic aluminosilicates, clays, refractory metal oxides, and the like, and mixtures thereof. A particularly preferred catalyst for fixed bed operation is one containing about 15 to 20 weight percent of equal parts by weight of sodium cyanide and potassium cyanide supported on hardwood charcoal which is preheated with hot caustic solution to remove a portion of the ash content, and then with hot oxalic acid solution.

For fluidized bed operation, the acrylonitrile catalysts are generally combined with a fluidization aid. Such fluidization aids might be an inert material such as silica, sand, or the like but preferably can be materials such as an attrition ground silica (Quso G–30) on which was deposited 18 weight percent of the mixed sodium and potassium cyanides and about 2 weight percent calcium oxide. The temperature of the reaction zone is preferably maintained within the range of 650° F. to 1200° F., and the feed rate will have a gaseous hourly space velocity in the range of about 50 to 3000 v./v./hr.

The synthesis of acrylonitrile is also smoothly and efficiently accomplished as a gas phase reaction involving hydrogen cyanide and an acetylenic hydrocarbon with other catalysts. This reaction involves the passage of intimately mixed gaseous hydrogen cyanide and the acetylenic hydrocarbon at a temperature within the range of from about 300° F. to about 1500° F. over a normally solid metal of Group II–B of the periodic table or, more preferably, the oxide or thermally stable salt of said metal. The normally solid metals of Group II–B of the periodic table are zinc and cadmium. The temperature of the reaction zone is preferably maintained within the range of 770° F. to 970° F. and the feed rate is so controlled as to give a residence or contact time of from 6 to 8 seconds.

In addition to the acrylonitrile product, unwanted nitrogen containing products are also formed in reactor 5. These products consist of up to about 10 parts by weight of succinonitrile, acetonitrile, and propionitrile, and up to about 2 parts by weight of heavy nitrogen by-products including trans-1-cyanobutene, cyanobutene, 2-cyanobutadiene, 3-cyanopropene, trans-1-cyanbutene-2, cis-1-cyanopropene, cis-1-cyanobutene-2, trans-cyanobutadiene, cis-cyanobutadine, and some other heavier materials.

The products and by-products are removed from reactor 5 through line 7 and passed to a separator 8 wherein acrylonitrile is removed through line 9 and at least a portion of the nitrogen by-products are removed through line 10 and recycled as quench to the plasma stream within reactor 3 via conduit 11. The action of the nitrogen by-products on the plasma stream will not only quench the stream but result in the by-products decomposing to form acetylene and hydrocyanic acid which are passed back to catalytic reactor 5 via line 4.

Thus, the contacting of the hydrocarbon in plasma stream 3 is ordinarily effected at a temperature above 3000° F. Generally, the plasma stream is initially quenched with sufficient ammonia to reduce the temperature of the stream to a temperature of the order of 2700° F. This temperature is low enough to minimize the carbon-hydrogen reaction, but high enough for the reaction of acetylene with ammonia to form HCN. After a very short reaction or residence time, e.g., 0.0001–0.1 second, the resulting stream (ammonia quenched) containing HCN, acetylene, etc., is given a final quench with nitrogen by-product and, if desired, another material such as water to reduce the temperature to a point where no thermal reactions are experienced, e.g., a temperature of 1000° F. or below.

If desired, a second portion of the nitrogen by-products can be passed to the effluent from plasma stream reactor 3 in line 4 via conduit 12 to further suppress the formation of undesired by-products within catalytic reactor 5.

Referring now to FIGURE 2, there is provided a plasma torch 20. The plasma torch 20 has introduced to it a plasma forming gas such as hydrogen or nitrogen through line 21. The gas is passed through an arc produced by high density current between two suitable electrodes (not shown) within torch 20 to heat the gas above its dissociation temperature and exits torch 20 as plasma flame (not shown) into reaction section 22. A lower alkane hydrocarbon reactant such as, for example, methane and ethane, is introduced into the reaction section 22 by way of line 23. Ammonia, which can be used as a quench, can be introduced into the reaction section through line 24. In the reaction chamber, the hydrocarbon is cracked and reacts with the ammonia to produce a mixture of acetylene and hydrocyanic acid. The reaction products are removed through line 25 and passed to reactor 26, which can be any suitable reactor for converting acetylene and hydrocyanic acid to acrylonitrile. In a preferred embodiment of the invention, the reactor contains a stationary bed of an alkali metal on charcoal catalyst. If necessary, additional hydrocyanic acid may be added to the feed through line 49. In order to minimize the production of nitrogen containing by-products, the ratio of acetylene to hydrocyanic acid should be greater than 1. The effluent from reactor 26 passes through line 27 and is quenched with water entering the process by way of line 28. The quenched reaction effluent containing acrylonitrile and the nitrogen containing by-products is passed to scrubber 29, wherein it is contacted with water. Lighter constituents such as unreacted plasma gas and unreacted acetylene are removed through overhead line 30 and passed to a separation zone, for example, diffusion cell 31, wherein hydrogen is separated from acetylene. Hydrogen, or nitrogen, as the case may be, is recycled to the feed through line 33. Hydrogen produced in the process can be removed at 33a if desired. Acetylene from diffusion cell 31 is returned to the process through line 32. Liquid from scrubber 29 is removed through line 34 and passed to stripper vessel 35 wherein acrylonitrile and the nitrogen containing by-products are stripped from water which passes back to scrubber 29 through line 36. The nitrogen containing by-products and acrylonitrile are removed from stripper 35 by way of line 37 through condenser 38 and into accumulator 39. Liquid from accumulator 39 is passed back to stripper 35 by way of line 40. Acrylonitrile and nitrogen containing by-products pass through line 41 and into fractionator zone 42 wherein the nitrogen containing by-products separated as a bottoms product pass through line 48 and are used as a quench in the reaction chamber 22 for the plasma stream. The contacting of the nitrogen containing by-products with the plasma stream causes the by-products to be cracked to acetylene and hydrocyanic acid. The overhead from fractionator 42 passes through line 43, condenser 44, and into accumulator 45. A portion of the liquid is passed back to fractionator zone 42 through line 47 and acrylonitrile is removed as a product through line 46.

FIGURE 3 is a diagrammatic illustration of a suitable detail of fractionator zone 42 wherein it is desired to recycle succinonitrile, propionitrile, and acetonitrile through conduit 48 as quench to the plasma stream. As illustrated, acrylonitrile and nitrogen by-products enter fractionator 42a via conduit 41 wherein succinonitrile and/or heavier nitrogen containing products are removed as bottoms via conduit 42a' and passed to conduit 48. Acrylonitrile, propionitrile, and acetonitrile are removed from fractionator 42a via conduit 42a'' and passed to fractionator 42b. Propionitrile is removed via conduit 42b' from fractionator 42b and passed to conduit 48, and acrylonitrile and acetonitrile are passed to fractionator 42c via conduit 42''. Fractionator 42c effects the separation of acetonitrile via conduit 42c' from acrylonitrile via conduit 43. As illustrated, the entire nitrogen containing by-products are passed as quench to the plasma stream with this apparatus; however, it is within the scope of this invention to recycle only a portion of these by-products as quench to the plasma stream.

Referring now to FIGURE 4, a plasma gas such as nitrogen or hydrogen enters plasma torch 20 through line 21 wherein it is passed through an arc produced by high density current between two suitable electrodes (not shown) within torch 20 to heat the gas above its dissociation temperature. The plasma stream exits torch 20 as a plasma flame or stream and enters reaction chamber 22 wherein it is contacted with a suitable lower alkane hydrocarbon such as, for example, methane and ethane through line 23, ammonia through line 24, and nitrogen by-product through line 69. Both of these streams serve as a quench for the plasma stream. In the reaction chamber 22, under the influence of the plasma stream, the hydrocarbon and the ammonia are converted to acetylene and hydrocyanic acid, which leave the reaction chamber 22 through line 25 and pass into reactor 26 wherein the acetylene and hydrocyanic acid are converted to acrylonitrile. Reactor 26 can be any suitable reactor which converts hydrocyanic acid and acetylene to acrylonitrile. In a preferred embodiment of the invention, the reactor is a fluidized bed reactor. The gases pass through the fluidized bed wherein they are contacted with a catalyst and converted to acrylonitrile preferably, and unavoidably, nitrogen containing by-products. It is generally desirable to maintain the ratio of acetylene to hydrocyanic acid as close to 1 as possible. The products from reactor 26 pass through line 50, separator 51 wherein solid catalyst is separated from the reaction products and returned to the reactor through line 52. The products pass through line 53, condenser 54 and into separator 55 wherein hydrocyanic acid, acrylonitrile and the nitrogen containing by-products separate as a liquid. The overhead containing some acrylonitrile passes through line 56 and is recycled to the feed. A portion of the overhead passes through line 57 and into scrubber 77 wherein the gas is scrubbed with acrylonitrile containing liquid from vessel 55. The liquid passes from vessel 55 through line 76 into scrubber 77. Gases containing hydrogen or nitrogen and low boiling point hydrocarbons are removed through line 82. The acrylonitrile containing liquid solvent is passed to stripper 79 wherein acetylene is removed as a gas through line 80 and recycled to the process through line 56 and acrylonitrile is removed as a liquid through line 83, passed through heater 84 and recycled to stripper 79 through line 85. A portion of the acrylonitrile passes through line 86 and is recycled as a solvent.

Hydrocyanic acid, acrylonitrile, and the nitrogen containing by-products pass from vessel 55 as a liquid through line 58 and into fractionator 59 wherein hydrocyanic acid is separated as a gas and is removed through overhead 60, condensed in condenser 61, and a portion of the liquid is recycled to the separator 59 through line 62. Another portion of the hydrocyanic acid is recycled to the process through line 63. As can be seen from FIGURE 4, the hydrocyanic acid as well as the other recycled products such as acetylene through lines 80 and 56 are admixed with the feed to the catalytic reactor 26. Acrylonitrile and nitrogen containing by-products are removed from separator 59 through line 64, heated in heat exchanger 65, and returned to the separator through line 66. A portion of the acrylonitrile and nitrogen containing by-products is passed to fractionator zone 67 wherein acrylonitrile separated as a gaseous product is removed through line 68. The nitrogen containing by-products are removed as a liquid through line 69 and returned to the plasma flame as quench. Fractionator 67 can be similar to the fractionator of FIGURE 3.

The plasma stream apparatus or generator that can be employed according to the invention is preferably energized with direct current. However, alternating current can be used. The plasma forming gas employed in the torch will form a sheath around the arc within the torch. The plasma forming gas is converted in the nozzle of the torch to a free plasma and leaves the nozzle and passes out of contact with the arc as a free plasma stream being projected from the nozzle. The plasma forming gas is passed into the reaction chamber, preferably at a velocity and/or pressure sufficient that the same will emerge from the nozzle as a free plasma stream having a velocity of at least 5 and preferably at least 50 feet per second and most preferably of at least 500–1000 feet per second. Plasma flame temperatures ranging from 3000° F. to 30,000° F. can be achieved depending upon the type of apparatus employed, the plasma forming gas and other considerations. If desired, mixtures of various gases or other materials can be used as the plasma forming material for operational reasons rather than chemical action reasons. For example, a mixture of hydrogen and argon has been successfully operated for reducing the arc voltage required by the use of pure hydrogen.

Ordinarily the voltage impressed between the nozzle of the torch and the plain electrodes is in the range of 20 volts to 500 volts so as to effect current flow between the nozzle and electrode in the range of 20 amperes to 2000 amperes. The electrode positions are important to the efficient and stable operation of the plasma generating apparatus. It is generally desirable for such apparatus to convert as much as possible of the plasma gas flowing through the apparatus into the actual plasma. This avoids waste of gas and also avoids the detrimental cooling effect of gas below plasma temperature. For the proper operation of a plasma torch apparatus, it is important that the flow of plasma gas be properly coordinated with the flow of electric current to the arc. It is usually advisable to start the plasma gas flowing before igniting the arc and then to only ignite the arc at low amperage, afterwards gradually increasing the current input to the arc. It is sometimes advisable to arrange to perform these functions automatically using knwon automation expedients to avoid damage to the equipment which might result from the failure of the operator to adjust the gases and current flow properly. Both the electric arc stream and the random plasma stream emit ultraviolet and infrared frequency radiation. It is therefore advisable for operators in the vicinity of the apparatus to use adequate radiation protection.

This invention can be more easily understood from a study of the following examples.

EXAMPLE I

Referring to FIGURE 2, 100 pounds of methane per hour is fed into reactor 22 via 23 at a point where the temperature of the hydrogen plasma is 4500. This plasma was produced by passing 36.8 pounds of hydrogen through an arc in which 582 kwh. of electrical energy is supplied (46 percent efficiency). Just downstream at 24, 35 pounds of ammonia per hour is introduced at a point where the temperature has dropped to 3000° F. The addition of the ammonia reduces the temperature to approximately 2500° F. Just before leaving reactor 22, the gas is further quenched to 1800° F. by addition of recycle streams of by-product nitriles comprising succinonitrile, propionitrile and acetonitrile and ammonia. The stream is now cooled to 900° F. and enters reactor 26 which is provided with internal cooling, so that the reaction products leave at a temperature of 1000° F. and are quenched to 300° F. by addition of water at 28. Water scrubber 29 separates hydrogen which is purified in diffusion cell 31 and recycled to the plasma generator 20. Excess hydrogen, that which is produced in the process by cracking the methane (about 12 pounds per hour) may be removed at 50. A mixture of acrylonitrile and by-product nitriles obtained after separation of hydrogen is fractionated in 42 to provide 100 pounds of acrylonitrile product and 20 pounds of nitrogen compound by-product containing mostly succinonitrile, propionitrile and acetonitrile, which is returned to reactor 22.

EXAMPLE II

One hundred pounds of methane feed per hour were passed directly through the electric arc producing a cracked gas stream at 3500° F. Ammonia (35 pounds per hour) was added to this stream which reduced the temperature to 3000° F.; a further quench with recycle gases reduced the temperature to 2500° F. As in Example I, this stream was then cooled to 900° F. and introduced into reactor 26. The reactor product is scrubbed with water and the hydrogen formed in the reactions, plus unreacted acetylene, is conveyed to an oil absorber where the acetylene is removed for recycle to reactor 26 and the hydrogen is removed from the process. The bottoms effluent of scrubber 29 is fractionated to remove unreacted ammonia for recycle to reactor 22. As in Example I, the resulting mixture of acrylonitrile is fractionated in 42 to provide 100 pounds per hour of acrylonitrile product and 20 pounds per hour of nitrogen compound by-product containing mostly succinonitrile, propionitrile and acetonitrile, which is returned to reactor 22.

We claim:
1. In a method for the production of acrylonitrile wherein acetylene and hydrocyanic acid are produced in a plasma stream reactor and are fed to a convertor wherein said acetylene and said hydrocyanic acid are converted to acrylonitrile, and nitrogen containing by-products, the improvement which comprises increasing the yield of acrylonitrile by recycling at least a portion of the nitrogen containing by-products as quench to said plasma stream.

2. The method of claim 1 wherein said portion of the nitrogen containing by-products is succinonitrile.

3. The method of claim 1 wherein said nitrogen containing by-products comprises succinonitrile, propionitrile, and acetonitrile.

4. The process of claim 1 further comprising recycling at least a portion of the nitrogen-containing by-products to said convertor.

5. A process for the production of acrylonitrile comprising passing a hydrocarbon selected from lower alkanes, and ammonia into a plasma stream reaction chamber under plasma stream conditions to produce acetylene and hydrocyanic acid, passing the effluent from said plasma stream reaction chamber to a fluidized bed reactor containing a catalyst for converting acetylene and hydrocyanic acid to acrylonitrile, passing said effluent through said fluidized bed to convert acetylene and hydrocyanic acid to acrylonitrile and nitrogen containing by-products, passing the effluent from said fluidized bed reactor through a condenser to condense higher boiling materials, passing said fluidized bed reactor effluent from said condenser to a liquid-vapor separator wherein higher boiling point materials as liquids are separated from lower boiling materials as gases, passing a portion of said liquids from said separator to a hydrocyanic acid separator wherein hydrocyanic acid is separated from acrylonitrile and said nitrogen containing by-products, recycling the hydrocyanic acid to said effluent from said plasma stream reaction chamber, passing acrylonitrile and said nitrogen containing by-products from said hydrocyanic acid separator to an acrylonitrile separation zone wherein acrylonitrile is separated from the nitrogen containing by-products and recycling at least a portion of said nitrogen containing by-products as quench to said plasma stream reaction chamber.

6. The process of claim 5 wherein said nitrogen containing by-products comprise succinonitrile.

7. The method of claim 5 wherein said nitrogen containing by-products comprise acetonitrile and propionitrile.

8. The process of claim 5 wherein said hydrocarbon is selected from methane and ethane.

9. The process of claim 5 wherein said catalyst consists essentially of metal selected from zinc and cadmium and compounds thereof.

10. A process for the production of acrylonitrile comprising contacting a hydrocarbon selected from lower alkanes, and ammonia with a plasma stream under conditions sufficient to convert said hydrocarbon and said ammonia to acetylene and hydrocyanic acid, passing the reaction products from said contacting to a catalytic reactor containing a catalyst for converting acetylene and hydrocyanic acid to acrylonitrile, passing said reaction products through said catalytic reactor for a time and at a temperature sufficient to convert said acetylene and hydrocyanic acid to acrylonitrile and some nitrogen containing by-products, passing the effluent from said catalytic reactor, said effluent containing acrylonitrile and said by-products to a separation vessel wherein unreacted acetylene and lower boiling point gases are separated from said acrylonitrile and said by-products, contacting said catalytic reactor effluent with a liquid to cool said effluent and to condense said acrylonitrile and said by-products, passing said acrylonitrile and said succinonitrile from said separator to a stripper vessel wherein said liquid is removed from said acrylonitrile and said by-products, passing said acrylonitrile and said by-products to a fractionator wherein acrylonitrile is separated as a gaseous product and said by-products are liquid, passing at least a portion of said by-products to said plasma stream contacting and using said by-products therein as quench for said plasma stream.

11. The process of claim 10 wherein said hydrocarbon is selected from methane and ethane.

12. The process of claim 10 wherein said catalyst consists essentially of an alkali metal-on-charcoal.

References Cited

UNITED STATES PATENTS

| 2,057,282 | 10/1936 | Tramm et al. | 260—465.3 XR |
| 2,415,414 | 2/1947 | Campbell | 260—465.3 |
| 2,429,459 | 10/1947 | Harris | 260—465.3 |

JOSEPH P. BRUST, *Primary Examiner.*

U.S. Cl. X.R.

260—679, 699; 23—151; 204—171, 177